Figure 1:
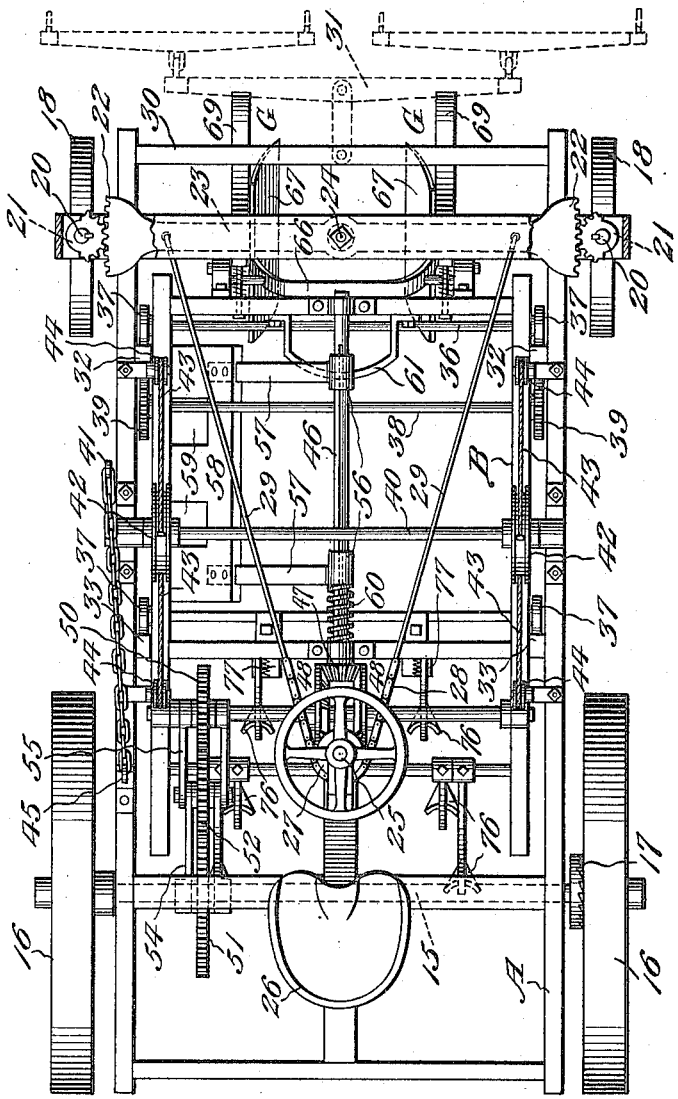

J. W. PATTERSON.
COTTON CHOPPER.
APPLICATION FILED AUG. 18, 1914.

1,145,790.

Patented July 6, 1915.
3 SHEETS—SHEET 1.

Witnesses
Edwin F. McKee

Inventor
J. W. Patterson
By Victor J. Evans
Attorney

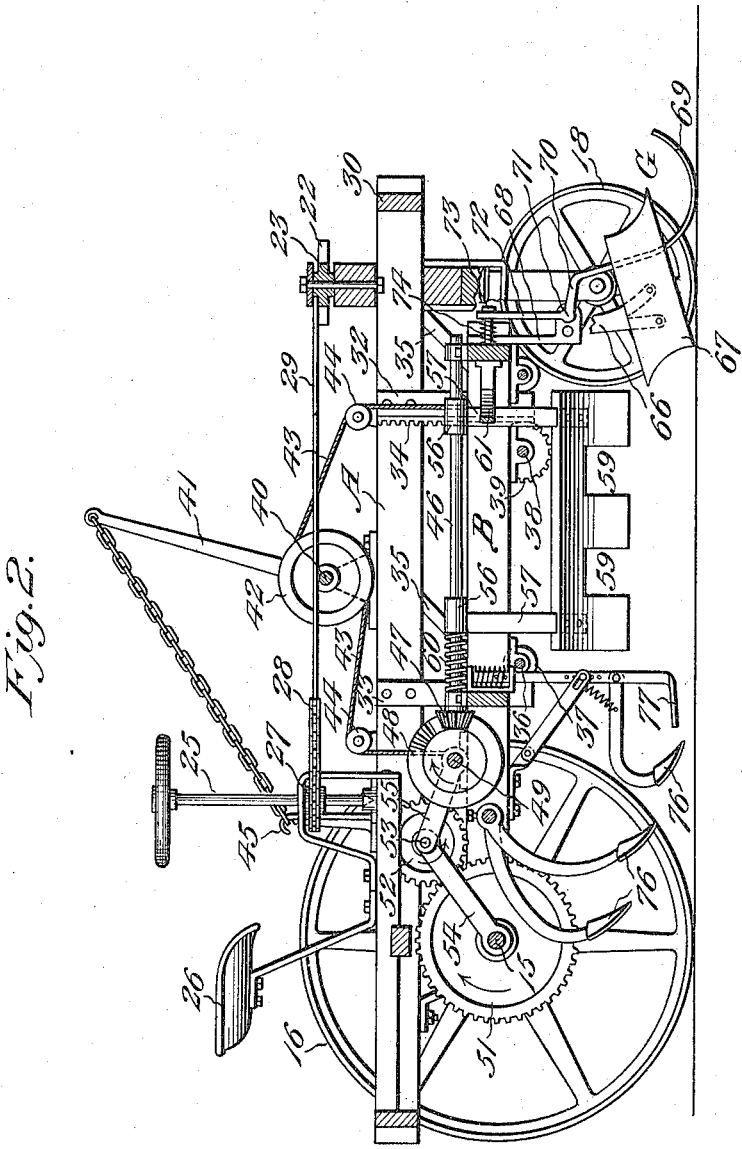

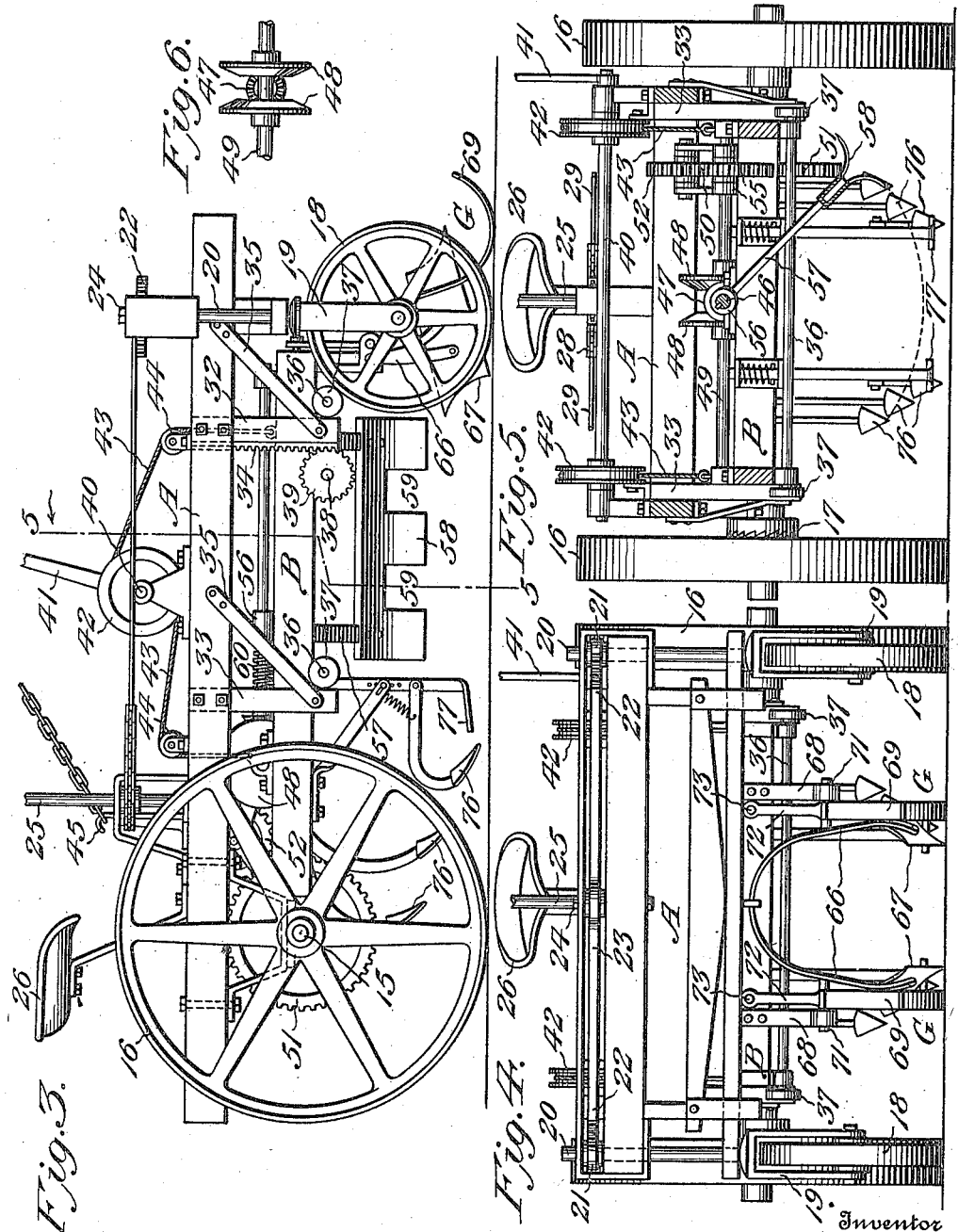

UNITED STATES PATENT OFFICE.

JOHN W. PATTERSON, OF DECATUR, ALABAMA.

COTTON-CHOPPER.

1,145,790.          Specification of Letters Patent.          Patented July 6, 1915.

Application filed August 18, 1914. Serial No. 857,420.

*To all whom it may concern:*

Be it known that I, JOHN W. PATTERSON, a citizen of the United States, residing at Decatur, in the county of Morgan and State of Alabama, have invented new and useful Improvements in Cotton-Choppers, of which the following is a specification.

This invention relates to cotton choppers, and it has particular reference to that class of machines in which a hoe or chopping member is supported by a rock shaft for swinging movement transversely across the row of plants, each swinging movement of the hoe serving to chop out the superfluous plants and to leave stands of cotton at regular intervals.

One object of the invention is to produce a simple and improved construction embodying a transporting frame, a vertically adjustable auxiliary frame carrying the chopping mechanism, and means whereby the chopping mechanism is actuated.

A further object of the invention is to produce a simple and improved construction whereby the chopping hoe shall be movable longitudinally of the carrying shaft, means being provided whereby the hoe is moved rearwardly with respect to the frame when in active operation, so that it will be temporarily deprived of forward movement with respect to the row of plants operated upon while it is in active operation.

Further objects of the invention are to simplify and improve the general construction and operation of the machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a longitudinal sectional view of the same. Fig. 3 is a side elevation. Fig. 4 is a front view. Fig. 5 is a transverse sectional view taken on the line 5—5 in Fig. 3. Fig. 6 is a detail view in elevation of the transmission gearing.

Corresponding parts in the several figures are denoted by like characters of reference.

The main frame A of the improved machine, which is mainly rectangular in shape, is supported at its rear end on an axle 15 having transporting wheels 16. The axle 15 is revoluble in its bearings, and the wheels 16 are revoluble on the axle, but one of said wheels may be connected with the axle by a clutch element, conventionally indicated at 17, for the purpose of rotating the axle when the machine is traveling in a forward direction. The clutch may be placed in or out of gear by any well known means, in order that motion may be transmitted from said axle to moving parts of the machine, or that such motion may be interrupted at will. The forward end of the main frame is supported on steering wheels consisting of caster wheels 18 mounted in forks 19 at the lower end of shanks 20 which are journaled vertically in the frame, each of said shanks being provided at its upper end with a pinion 21. The pinions 21 at the two sides of the frame are in mesh with arcuate racks 22 formed at the two ends of a rocking bar 23 pivotally supported at 24. A vertical shaft or post 25 supported in suitable proximity to the driver whose seat 26 is supported near the rearward end of the frame carries a sprocket wheel 27 over which is guided a chain 28 the ends of which are connected either directly or by means of rods 29 with the two ends of the rocking bar 23 which may thus be actuated to rotate the shanks carrying the steering wheels for the purpose of steering the machine. The forward cross bar 30 of the frame A is provided with draft means, such as an evener 31, suitably attached thereto or connected therewith.

The main frame A is provided with depending brackets 32, 33, said brackets being connected with the side bars of the frame, respectively, near the front and rear ends thereof. The front brackets are provided with racks 34 at their rearward edges, and the several brackets are suitably reinforced by braces 35. An auxiliary frame B of approximately rectangular form is provided with shafts 36 carrying wheels 37 which are guided on the smooth forward edges of the respective brackets 32 and 33. Another transverse shaft 38 carried by the frame B is provided with pinions 39 meshing with the racks 34 at the rearward edges of the brackets 32.

To support the auxiliary frame B and to effect vertical adjustment thereof, the main frame A carries a transverse shaft 40 provided with an arm or lever 41 whereby it may be rocked. Said shaft also carries a grooved wheel 42 at diametrically opposite sides of which are attached flexible elements 43 guided over guide wheels 44 to the frame B with which they are connected. It will be seen that by rocking the shaft 40, the auxiliary frame may be raised or lowered. For the purpose of supporting it in an elevated position the arm or lever 41 may be placed in engagement with a retaining hook 45.

The auxiliary frame carries a longitudinal rock shaft 46 having at its rear end a bevel pinion 47 adapted to mesh with two mutilated gears 48, one at each side thereof, said mutilated gears being fixed on a shaft 49 carrying a pinion or spur wheel 50 which receives motion from a spur wheel 51 on the rear axle through the medium of an intermediate spur wheel 52 which is supported on a shaft 53 carried by toggle members 54, 55 which are pivoted, respectively, on the rear axle 15 and on the shaft 49. The latter, as will be seen, is mounted for rotation on the vertically movable auxiliary frame, and the distance of said shaft from the rear axle is, therefore, not constant. It is obvious, however, that when the auxiliary frame is moved in a direction to decrease the distance of the shaft 49 from the axle 15, the toggle arms will collapse, while when the auxiliary frame is moved in a direction to increase the distance of the shaft 49 from the axle 15, the toggle arms will expand without disengaging the spur wheel 52 from the spur wheels 50 and 51. The rock shaft 46 will thus receive oscillatory motion at various adjustments of the auxiliary frame.

Hubs 56 each having a radial arm 57 are mounted slidably on the rock shaft 46, and the arms 57 are connected together by the chopping hoe or blade 58 which is thereby supported. The chopping hoe may be of any desired construction; preferably it is composed of two separate side members or blades joined together in approximate V-shape, and said blades are provided with indentations 59 suitably spaced apart for the purpose of leaving stands of cotton at each stroke or operation. By this construction the row of plants will be engaged by one of the blades at each stroke or movement in any direction. The chopping hoe 58, the arms 57 and the hubs 56 combine to form what I prefer to call the cutting frame, and said cutting frame is normally moved in a forward direction on the shaft 46 by the action of a coiled spring 60. The auxiliary frame B supports an arcuate guide member 61 which is so disposed in the path of the forward arm 57 of the cutting frame that when the said frame swings from one side to the other, it will be moved rearwardly against the tension of the spring 60. The parts are to be so proportioned and arranged that when the machine moves forward at average speed the rearward movement of the cutting frame on the rock shaft 46 will be equal to the forward movement of the machine during a predetermined period, or approximately so. The chopping hoe will thus make no forward movement with respect to the row of plants while it is engaged in its active chopping operation, thus avoiding the uprooting of the stands of plants that it is desired to leave untouched. The action of the spring 60 will serve to restore the cutting frame in a forward direction on the rock shaft 46.

A yoke 66 carried by the auxiliary frame B supports the scraper blades 67 which serve to trim the edges of the row that is to be operated upon in advance of the operation of the chopping hoe. The frame B is provided with depending hangers or brackets 68 with which gage members G are pivotally connected, said gage members including arcuate blades 69 that are positioned in advance of the scrapers 67, said blades having rearwardly extending arms 70 that are pivoted on the brackets 68 at 71 and are provided with upward extensions 72 that are connected with bolts 73 passing through the front cross bar of the frame B, said bolts having springs 74 that serve to force the upward extensions 72 in a forward direction, thereby holding the gage blades 69 in ground engaging position. The frame B also carries cultivator blades 76 and resiliently supported gage members 77 to regulate the depth of operation of said cultivator blades.

From the foregoing description, taken in connection with the drawings hereto annexed, the operation and advantages of this invention will be readily understood. When the machine is drawn over the field it straddles the row of plants. The scrapers 67 will trim the sides of the row, said scrapers being followed by the chopping hoe which, at predetermined intervals, governed by the mutilated portions of the bevel gears 58, will swing across the row, thereby chopping out the superfluous plants, and leaving stands at regular intervals. The chopping hoe is followed by the cultivator blades which throw the loose dirt in the direction of the roots of the remaining plants, the vigorous growth of which will thus be promoted.

Having thus described the invention, what is claimed as new, is:—

1. In a machine of the class described, a carrying frame having supporting wheels and a rear axle, an auxiliary frame supported for vertical adjustment with respect to the carrying frame, means for raising and lowering the auxiliary frame, a rock shaft on the auxiliary frame carrying a chopping frame and a bevel pinion, a counter shaft on the auxiliary frame having opposed mutilated bevel gears meshing with the bevel pinion, and means for transmitting motion to the counter shaft from the rear axle including spur wheels on said counter shaft and axle, toggle arms pivoted on said counter shaft and axle, and a spur wheel supported by the toggle arms in mesh with the spur wheels on the counter shaft and the axle.

2. In a machine of the class described, a wheel supported carrying frame, front and rear brackets depending at each side of said frame, the front brackets having toothed rearward edges, an auxiliary frame having guide wheels engaging the forward edges of the depending front and rear brackets, and pinions engaging the toothed rearward edges of the front brackets, a transverse shaft supported on the main frame, means for rocking said shaft, a grooved wheel on said shaft, flexible elements, each connected at one end with the grooved wheel at diametrically opposite sides thereof and at the other end with the auxiliary frame, and guide means over which said flexible elements are guided.

3. In a machine of the class described, a carrying frame, an auxiliary frame supported for vertical adjustment, a rock shaft on the auxiliary frame, means for intermittently actuating said rock shaft, a cutting frame slidable on the rock shaft, and an arcuate guide supported on the auxiliary frame in the path of the cutting frame.

4. In a machine of the class described, a chopping device including a rock shaft, means for intermittently actuating the same, a cutting frame slidable on the rock shaft, a spring to force said cutting frame in one direction, and an arcuate guide member supported in the path of the cutting frame to force said frame against the tension of the spring as it swings from side to side.

5. In a machine of the class described, a chopping device comprising a rock shaft, hubs mounted slidably on said rock shaft to oscillate therewith, arms extending from said hubs, a chopping hoe connected with said arms and combining therewith and with the hubs to constitute a chopping frame, a spring engaging the chopping frame to force said frame normally in one direction with respect to the rock shaft, and an arcuate guide member supported in the path of one of the arms of the chopping frame to force said frame against the tension of the spring.

In testimony whereof I affix my signature in presence of two witnesses.

JOHN W. PATTERSON.

Witnesses:
 A. B. BRINDLEY,
 C. B. MITCHELL.

Copies of this patent may be obtained for five cents each, by addressing the "Commissioner of Patents, Washington, D. C."